US 6,899,378 B2

(12) United States Patent
Rhodes et al.

(10) Patent No.: US 6,899,378 B2
(45) Date of Patent: May 31, 2005

(54) SECONDARY FOLDING SEAT IN A VEHICLE

(75) Inventors: Louis A Rhodes, Farmington Hills, MI (US); Stephen T Lim, Farmington Hills, MI (US); Todd E Olson, Livonia, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/659,476

(22) Filed: Sep. 10, 2003

(65) Prior Publication Data

US 2005/0052053 A1 Mar. 10, 2005

(51) Int. Cl.[7] .......................... B62D 33/02; B60N 2/02; B60N 2/30
(52) U.S. Cl. ................. 296/183.1; 296/63; 296/66; 296/68; 296/26.08
(58) Field of Search ................. 296/183.1, 63, 296/65.01, 66, 68, 65.05, 65.09, 69, 65.16, 26.01, 26.08, 26.1, 26.11, 190.08, 190.11; 297/325, 326, 329

(56) References Cited

U.S. PATENT DOCUMENTS

| | | | | |
|---|---|---|---|---|
| 2,677,574 A | * | 5/1954 | Golubics | 296/66 |
| 2,971,794 A | * | 2/1961 | Garcia | 296/26.1 |
| 3,169,792 A | * | 2/1965 | Solano | 296/99.1 |
| 4,480,868 A | * | 11/1984 | Koto | 296/190.11 |
| 5,934,727 A | | 8/1999 | Store et al. | |
| 6,217,096 B1 | * | 4/2001 | Koiwa et al. | 296/24.43 |
| 6,260,916 B1 | | 7/2001 | Hunt | |
| 6,416,104 B1 | | 7/2002 | Fisher et al. | |
| 6,513,863 B1 | | 2/2003 | Renke et al. | |

FOREIGN PATENT DOCUMENTS

| | | | | |
|---|---|---|---|---|
| JP | 357104424 | * | 6/1982 | 296/65.09 |
| JP | 357104425 | * | 6/1982 | 296/65.09 |
| JP | 359032525 | * | 2/1984 | 296/65.09 |
| JP | 361218445 | * | 9/1986 | 296/65.09 |
| JP | 403099986 | * | 4/1991 | 296/65.09 |
| JP | 2000071830 | * | 3/2000 | |
| JP | 2001063477 | * | 3/2001 | |

* cited by examiner

Primary Examiner—H. Gutman
(74) Attorney, Agent, or Firm—Ralph E. Smith (57) ABSTRACT

Optionally expandable passenger seating is provided in a second compartment of a vehicle body including a first compartment and a second compartment rearwardly adjacent the first compartment, through use of a passenger seating cushion attached to an interior surface of a rear wallgate, of the first compartment, optionally separating the first and second compartments from one another. The rear wallgate is attached at a lower edge thereof for pivoting movement from a vertical position, whereat the rear wallgate at least partially separates the first compartment from the second compartment with the interior surface of the wallgate facing into the first compartment, to a horizontal position, whereat the rear wall gate extends into the second compartment with the interior surface of the rear wallgate facing generally upward, thereby allowing a passenger to sit on the cushion when the rear wall gate is in the horizontal position.

17 Claims, 6 Drawing Sheets

SECONDARY FOLDING SEAT IN A VEHICLE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

This invention relates to vehicles, such as pickup trucks and sport utility vehicles, having a first compartment configured primarily for carrying passengers and a second compartment, rearwardly adjacent the first compartment, configured for carrying cargo, and more particularly to providing optionally expandable passenger seating in the second compartment of such vehicles.

2. Description of Related Art

In vehicles such as pickup trucks and sport utility vehicles that typically have a first compartment configured primarily for carrying a driver and passengers, and a second compartment rearwardly adjacent the first compartment configured for carrying cargo, it is often desirable to provide more that just a single row of seats, so that additional passengers may be carried.

One common approach to providing this seating is illustrated by extended cab pickup trucks, where the first compartment, or cab, is permanently extended into the second compartment, or cargo bed, of the truck, with the length of the cargo bed being shortened as a result. Generally the cargo bed is in an extended cab vehicle is shortened, with the vehicle wheelbase remaining essentially unchanged, because retaining a full length cargo bed with an extended cab, would result in a vehicle that would be undesirably long. In this approach, passenger carrying capacity is often given priority over cargo carrying capacity.

Where the need for carrying cargo is small, this approach works well. Where there is an occasional need to carry more cargo, or long cargo, such as lumber for example, the permanent loss of cargo bed length in an extended cab vehicle is undesirable. As a result, various approaches have been developed for providing an opening into the passenger compartment from the cargo bed, for extending the length of the cargo bed, when the vehicle operator desires to transport longer cargo. The cargo is then allowed to extend forward into the first compartment, through the area that would be occupied by a second row of passenger seats in an extended cab vehicle. The following United States patents disclose such an approach: U.S. Pat. No. 5,934,727, to Store, et al.; U.S. Pat. No. 6,260,916 B1, to Hunt; U.S. Pat. No. 6,416,104 B1, to Fisher, et al.; and U.S. Pat. No. 6,513,863 B1.

For some vehicles, however, the extended cab approach is undesirable. In a pickup truck that is used primarily for carrying cargo, and only occasionally for carrying more passengers than can be accommodated in a front row of seats, for example, giving priority to passenger seating over cargo carrying capacity is undesirable. In sport utility vehicles that are designed to operate off-road, where having a short wheelbase is highly desirable, and the need to carry cargo is typically small, extending the cab to provide additional optionally expandable seating capacity can result in undesirably compromising the design and performance of the vehicle in performing its desired function.

It would be advantageous, therefore, to provide optionally expandable passenger seating in the second compartment rearwardly adjacent the first compartment in such a vehicle body.

BRIEF SUMMARY OF THE INVENTION

The invention provides optionally expandable passenger seating in the second compartment of a vehicle body including a first compartment and a second compartment rearwardly adjacent the first compartment, through use of a passenger seating cushion attached to an interior surface of a rear wallgate, of the first compartment, optionally separating the first and second compartments from one another. The rear wallgate is attached at a lower edge thereof for pivoting movement from a vertical position, whereat the rear wallgate at least partially separates the first compartment from the second compartment with the interior surface of the wallgate facing into the first compartment, to a horizontal position, whereat the rear wall gate extends into the second compartment with the interior surface of the rear wallgate facing generally upward. The passenger seating cushion is attached to the interior wall of the rear wallgate, in such a manner that a passenger may be seated on the cushion when the rear wall gate is in the horizontal position.

The invention may take the form of a vehicle body wherein the first compartment further includes a rear window that may be removable or retractable into the rear wallgate. Where the rear window is removable, it may be stowable within the rear wallgate.

The second compartment may include a cargo bed having a bed floor including a floor panel that is movable for receiving the rear wallgate when the rear wallgate is in the horizontal position. The movable floor panel may be hinged to pivot from a horizontal position to a vertical position located rearwardly from the rear wallgate when the rear wallgate is in the horizontal position.

The vehicle body may further include a folding seat back operatively attached to the rear wallgate for movement from a folded position, whereat the seat back extends in a direction generally parallel to the interior surface of the rear wall gate, to an un-folded position, whereat the seat back extends in a direction generally perpendicular to the interior surface of the rear wallgate, for supporting the back of a passenger seated on the cushion when the rear wallgate is in the horizontal position. The seat back may be operatively attached in such a manner that the seat back is pivoted from the folded to the un-folded position as the rear wallgate is pivoted from the vertical to the horizontal position. Where the first compartment includes a front seat, the seat cushion and seat back may be operatively attached to the rear wallgate in such a manner that the seat cushion and seat back are stowed between the front seat and the interior surface of the rear wallgate, with the seatback in the folded position, when the rear wallgate is in the vertical position. The seat back may be operatively connected in such a manner that it is oriented in the un-folded position so that a passenger seated on the seat cushion is facing forward toward the first compartment.

Our invention may also take the form of a method for providing optionally expandable passenger seating in the second compartment of a vehicle body including a first compartment and a second compartment rearwardly adjacent the first compartment, through use of a rear wallgate of the first compartment for optionally separating the first and second compartments from one another, according to our invention, as described above or in the subsequent detailed description.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

BRIEF DESCRIPTION OF THE SEVERAL VIEWS OF THE DRAWINGS

The present invention will become more fully understood from the detailed description and the accompanying drawings, wherein.

In all of the above FIGS. 1–9, the pickup truck is partially shown in phantom lines, for purposes of clarity of illustration.

DETAILED DESCRIPTION OF THE INVENTION

FIGS. 1–9 show an exemplary embodiment of a vehicle body 10, according to our invention, including a first compartment 12, a second compartment 14 rearwardly adjacent the first compartment 12, and a secondary seating apparatus 16 for optionally providing expanded passenger seating in the second compartment 14. The secondary seating apparatus 16 includes a movable rear wallgate 18 of the first compartment 12, for optionally separating the first and second compartments 12, 14 from one another.

Figure 1:
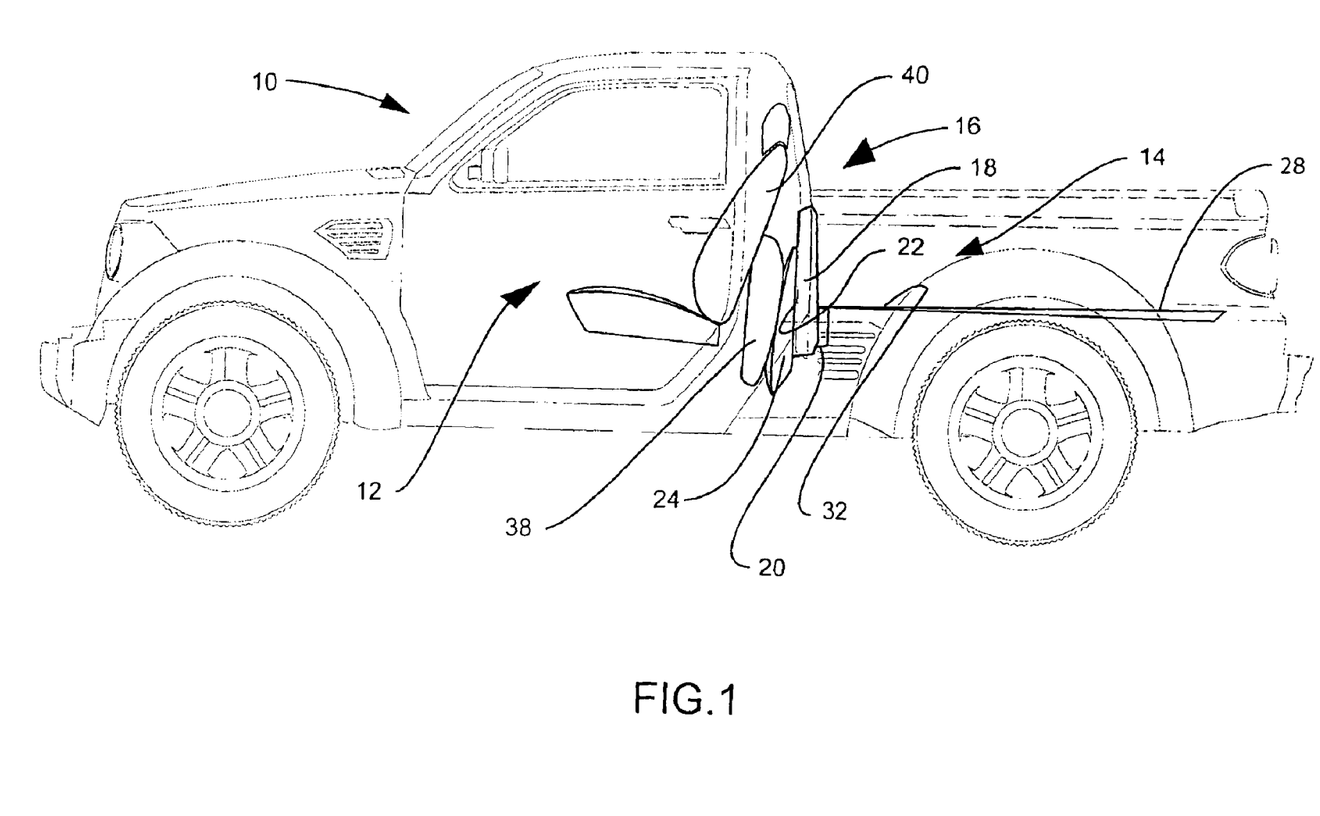
FIG. 1 is a side view of an exemplary embodiment of a pickup truck, according to our invention, having an optionally expandable secondary seating apparatus shown in a folded and stowed position behind the front seat of the pickup truck.
Figure 2:
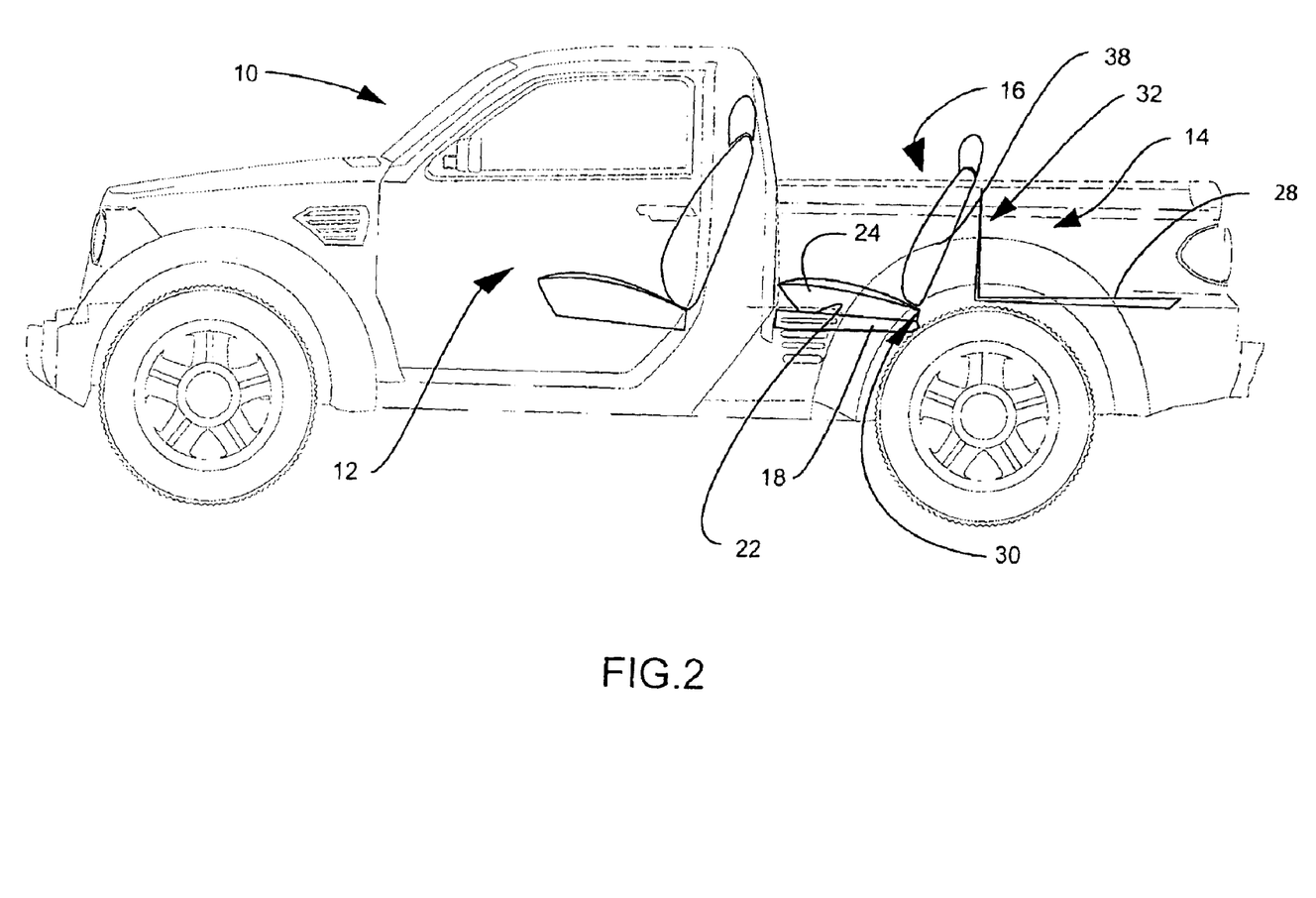
FIG. 2 is a side view of the exemplary embodiment of FIG. 1, showing the optionally expandable secondary seating apparatus in an un-folded position for providing expanded passenger seating in the cargo bed of the pickup truck.

The rear wallgate 18 is being attached at a lower edge 20 thereof for pivoting movement from a vertical position, as shown in FIG. 1, whereat the rear wallgate 18 separates a lower part of the first compartment 12 from the second compartment 14, to a horizontal position, as shown in FIG. 2, whereat the rear wall gate 18 extends into the second compartment 14. The rear wallgate 18 defines an interior surface 22 thereof, which faces into the first compartment 12 when the rear wallgate 18 is in the vertical position and facing generally upward when the rear wallgate 18 is in the horizontal position.

A passenger seating cushion 24 is attached to the interior surface 22 of the rear wallgate 18, so that a passenger may be seated on the cushion 24 when the rear wall gate 18 is in the horizontal position shown in FIG. 2.

Figure 3:
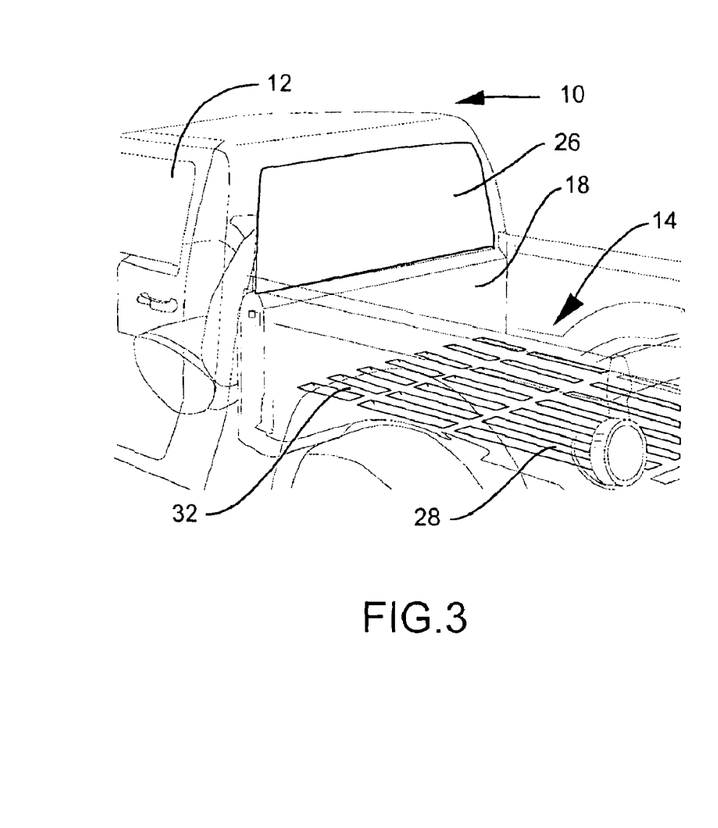
FIGS. 3–6 are perspective rear views looking into the cargo bed of the pickup truck of FIGS. 1 and 2, showing the configuration and operation of a rear window of the front passenger compartment of the pickup truck, and a movable floor panel in the cargo bed of the pickup truck.
Figure 4:
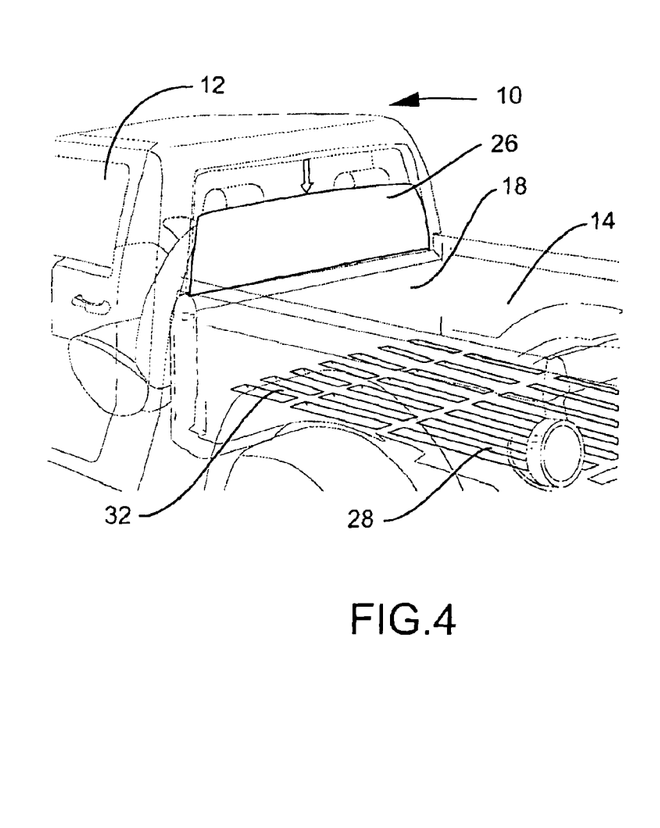
Figure 5:
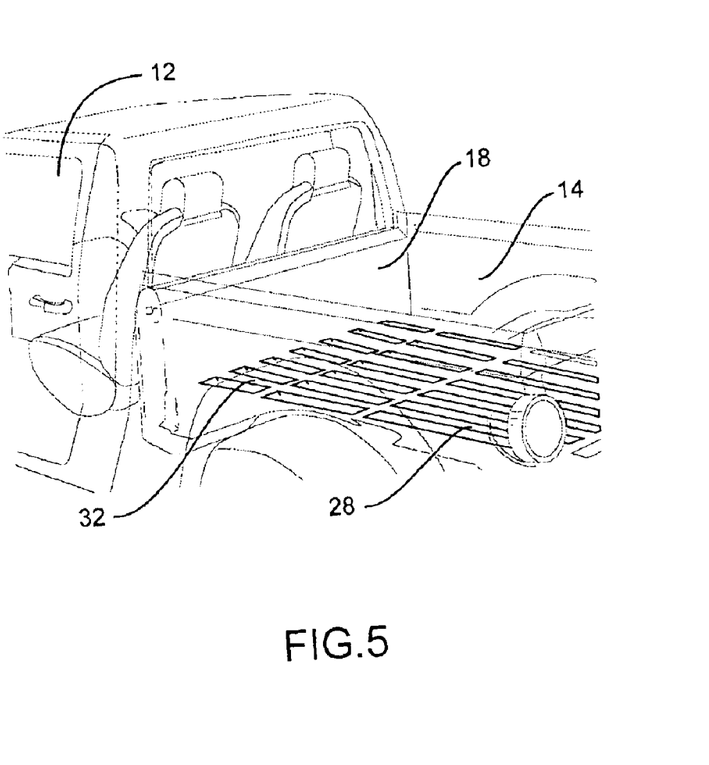
Figure 6:
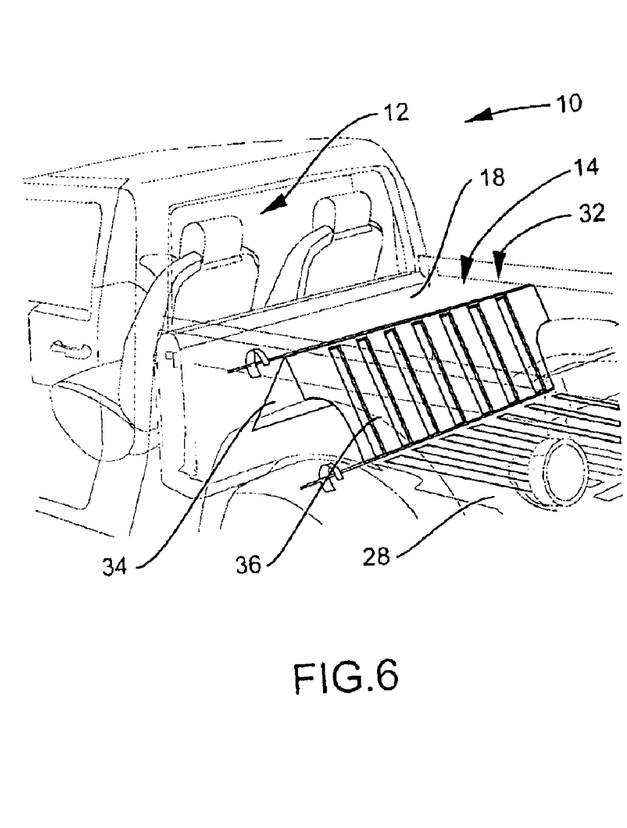

As shown, in FIGS. 3–5, the first compartment 12 further includes a rear window 26 that is retractable into, and stowable inside of, the rear wallgate 18. In other embodiments of our invention, it may be desired to have the rear window 26 be removable, rather than retractable. Where the rear window 26 is removable, the removed rear window 26 may still be stowable in the rear wallgate 18. We contemplate that in some embodiments of our invention, both the rear window 26 and the rear wallgate 18 will be sealed with weather stripping, to form an environmentally sealed barrier between the first and second compartments 12, 14, when the rear wallgate 18 is in the vertical position, and the rear window 26 is installed, or in a raised position, as shown in FIG. 3, above the rear wallgate 18.

As shown, in FIGS. 1–5, the second compartment forms a cargo bed 14, and the rear wallgate 18 latches to the bed 14, using a conventional latch mechanism, as indicated at 30 in FIG. 2, when the rear wallgate 18 is in the horizontal position.

Figure 7:
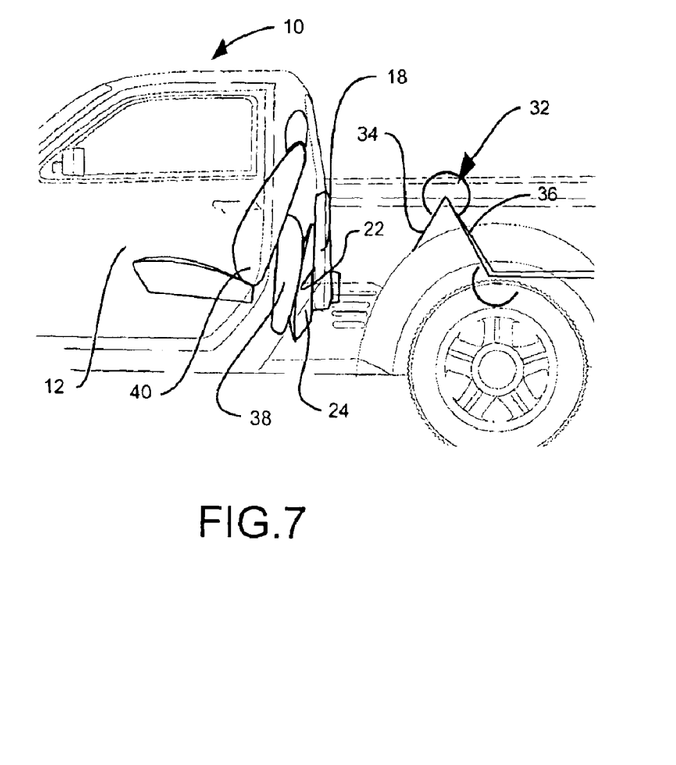
FIGS. 7–9 are side views of the pickup truck of FIGS. 1–6, showing various aspects of the construction and operation of the exemplary embodiment of our invention.
Figure 8:
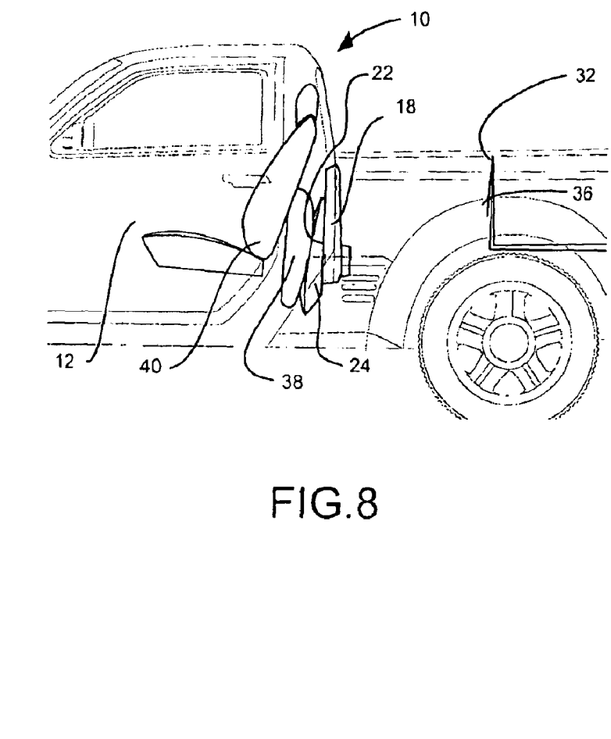
Figure 9:
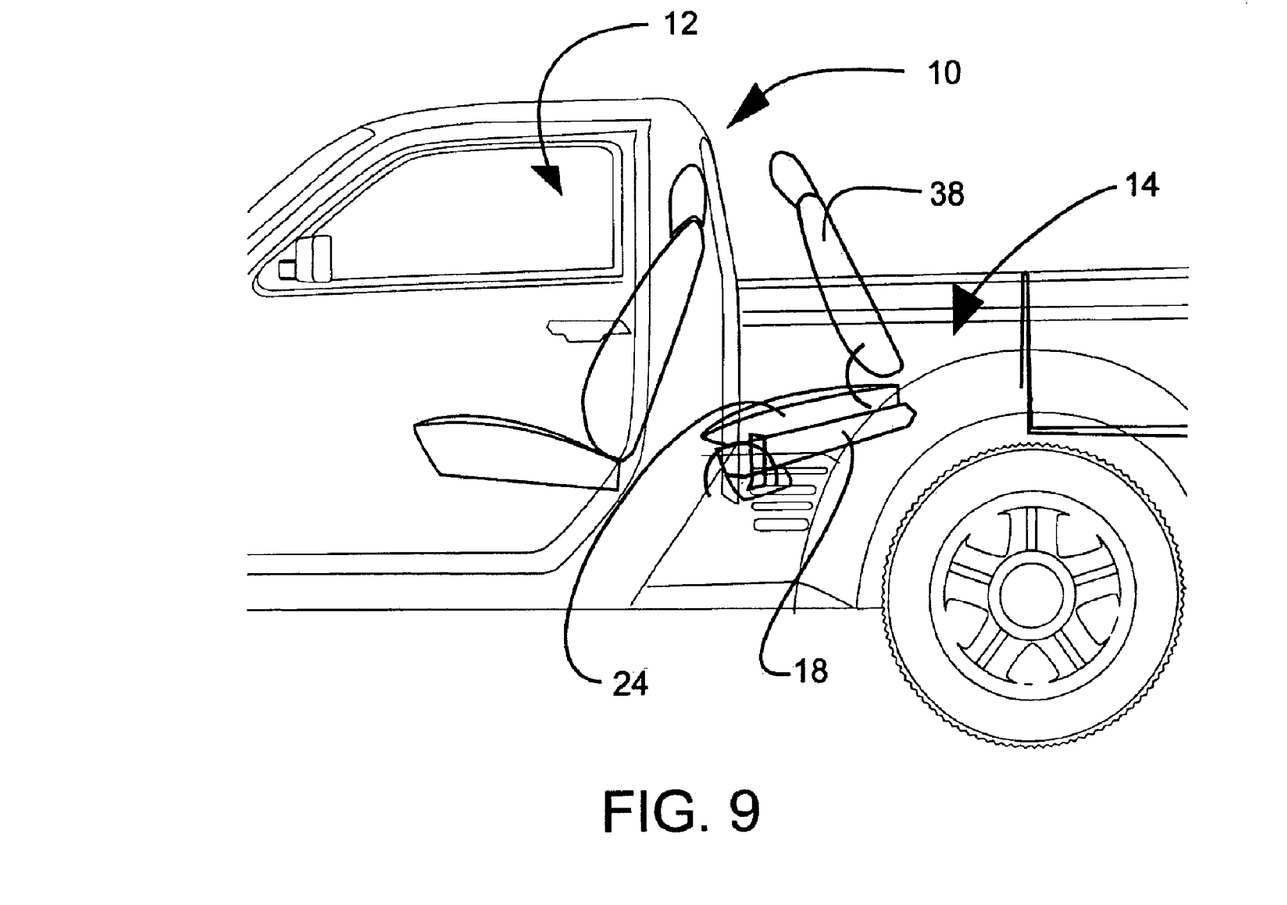

As shown in FIGS. 1–8, the cargo bed 14 has a bed floor 28 including a floor panel 32 that is movable for receiving the rear wallgate 18 when the rear wallgate 18 is in the horizontal position. As shown, in FIGS. 6 and 7, the movable floor panel 32 includes a forward bi-fold panel 34, hinged to a rear bi-fold panel 36, with the rear bi-fold panel 36 hinged to the bed floor 28, in such a manner that the hinged floor panel 32 is hinged to pivot from a horizontal position, as shown in FIGS. 1, and 3–5, to a vertical position, as shown in FIGS. 2 and 8, located rearwardly from the rear wallgate 18, when the rear wallgate 18 is in the horizontal position, as shown in FIG. 2. The hinged floor paned 28 is secured, in the vertical and horizontal positions thereof, by latches, (not shown), which may be of conventional construction.

As shown, in FIGS. 1, 2, 7 and 8, the vehicle body 10 and seating apparatus 16, of the exemplary embodiment, further includes a folding seat back 38 operatively attached to the rear wallgate 18 for movement from a folded position, as shown in FIGS. 1, 7, and 8, whereat the seat back 38 extends in a direction generally parallel to the interior surface 22 of the rear wall gate 18, to an un-folded position, as shown in FIG. 1, whereat the seat back 38 extends in a direction generally perpendicular to the interior surface 22 of the rear wallgate 18, for supporting the back of a passenger seated on the cushion 24 when the rear wallgate 18 is in the horizontal position. We contemplate that in some embodiments of our invention, the seat back 38 will be operatively attached by linkages in such a manner that the seat back 38 is pivoted from the folded to the un-folded position, as the rear wallgate 18 is pivoted from the vertical to the horizontal position, and such that the seat back 38 is pivoted from the un-folded to the folded position as the rear wallgate 18 is pivoted from the horizontal to the vertical position.

As shown, in FIGS. 1, 7 and 8, in the vehicle body 10 of the exemplary embodiment, the first compartment 12 includes a front seat 40, and the seat cushion 24 and seat back 38, attached to the rear wallgate 18, are stowed between the front seat 40 and the interior surface 22 of the rear wallgate 18, with the seatback 38 in the folded position, when the rear wallgate 18 is in the vertical position. The seat back 38 of the exemplary embodiment is oriented in the un-folded position so that a passenger seated on the seat cushion 24 is facing forward toward the first compartment 12, in the same direction as a driver or passengers seated in the front seat 40.

To provide expanded seating with the exemplary embodiment disclosed above, the rear window 26 is lowered into and stowed within the rear wallgate 18, as shown sequentially in FIGS. 3–5. The movable floor panel 32 of the cargo bed floor 28 is raised from the horizontal to the vertical position, as shown sequentially in FIGS. 5–8. The rear wallgate 18 is pivoted rearward into the cargo bed 14, from the vertical to the horizontal position of the rear wallgate 18, and the seat back 38 is pivoted from its folded position to its un-folded position, as shown sequentially in FIGS. 8, 9, and 2. This process is performed in reverse order to restore the cargo bed 14 to its full length, and close the rear of the first compartment 12 with the rear wallgate 18 and rear window 26.

Those skilled in the art will also readily recognize that, while the embodiments of our invention disclosed herein are presently considered to be preferred, various changes and modifications can be made without departing from the spirit and scope of the invention. For example, our invention may be used in a vehicle body having a top over the second compartment 14, where the open air environment provided by the open cargo bed 14 of the exemplary embodiment is not desired. Such a top may cover all, or only a portion of the second compartment 14, and may provide a complete, or only partial closure of the second compartment 14 against the elements. The top may be permanently attached to the vehicle body 10, be removable, or be a convertible top. Our invention may be used in vehicles other than pickup trucks and sport utility vehicles.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A vehicle body, comprising a first compartment, a second compartment rearwardly adjacent the first compartment, and a rear wallgate of the first compartment selectively separating the first and second compartments from one another, the rear wallgate being attached at a lower edge thereof for pivoting movement from a vertical position, whereat the rear wallgate at least partially separates the first compartment from the second compartment, to a horizontal position, whereat the rear wall gate extends into the second compartment, the rear wall-gate further defining an interior surface thereof facing into the first compartment when the rear wallgate is in the vertical position and facing generally upward when the rear wallgate is in the horizontal position, the rear wallgate further including a passenger seating cushion attached to the interior wall of the rear wallgate to provide a seat when the rear wall gate is in the horizontal position, wherein the second compartment includes a cargo bed having a bed floor including a floor panel that is movable for receiving the rear wallgate when the rear wallgate is in the horizontal position.

2. The vehicle body of claim 1, wherein the first compartment further includes a rear window.

3. The vehicle body of claim 2 wherein the rear window is retractable into the rear wallgate.

4. The vehicle body of claim 2 wherein the rear window is removable.

5. The vehicle body of claim 4 wherein the rear window is stowable within the rear wallgate.

6. The vehicle body of claim 1 wherein the second compartment includes a cargo bed, and the rear wallgate latches to the bed when the rear wallgate is in the horizontal position.

7. The vehicle body of claim 1 wherein the movable floor panel is hinged to pivot from a horizontal position to a vertical position located rearwardly from the rear wallgate when the rear wallgate is in the horizontal position.

8. The vehicle body of claim 7 wherein the movable floor panel includes a forward bi-fold panel hinged to a rear bi-fold panel, with the rear bi-fold panel hinged to the bed floor.

9. The vehicle body of claim 1 further including a folding seat back operatively attached to the rear wallgate for movement from a folded position, whereat the seat back extends in a direction generally parallel to the interior surface of the rear wall gate, to an un-folded position, whereat the seat back extends in a direction generally perpendicular to the interior surface of the rear wallgate, for providing a seat back when the rear wallgate is in the horizontal position.

10. The vehicle body of claim 9 wherein the seat back is operatively attached in such a manner that the seat back is pivoted torn the folded to the un-folded position as the rear wallgate is pivoted from the vertical to the horizontal position.

11. The vehicle body of claim 9 wherein the seat back is operatively attached in such a manner that the seat back is pivoted from the un-folded to the folded position as the rear wallgate is pivoted from the horizontal to the vertical position.

12. The vehicle body of claim 9 wherein the first compartment further includes a front seat, and the seat cushion and seat back attached to the rear wallgate are stowed between the front seat and the interior surface of the rear wallgate, with the seatback in the folded position, when the rear wallgate is in the vertical position.

13. The vehicle body of claim 9 wherein the seat back is oriented in the un-folded position so that a passenger seated on the set cushion is facing forward toward the first compartment.

14. A secondary seating apparatus for selectively providing expanded passenger seating in a second compartment of a vehicle body including a first compartment and the second compartment rearwardly adjacent the first compartment, the secondary seating apparatus comprising:

a rear wallgate of the first compartment selectively separating the first and second compartments from one another;

the rear wallgate being attached at a lower edge thereof for pivoting movement from a vertical position, whereat the rear wallgate at least partially separates the first compartment from the second compartment, to a horizontal position, whereat the rear wall gate extends into the second compartment;

the rear wallgate further defining an interior surface thereof facing into tho first compartment when the rear wallgate is in the vertical position and facing generally upward when the rear wallgate is in the horizontal position; and a passenger sealing cushion attached to the interior wall of the rear wallgate to provide a seat when the rear wall gate is in the horizontal position, wherein the second compartment includes a cargo bed having a bed floor including a floor panel that is movable for receiving the rear wallgate when the rear wallgate is in the horizontal position.

15. The secondary seating apparatus of claim 14 wherein the second compartment includes a cargo bed, and the rear wallgate latches to the bed when the rear wallgate is in the horizontal position.

16. The secondary seating apparatus of claim 14 further including a folding seat back operatively attached to the rear wallgate for movement from a folded position, whereat the seat back extends in a direction generally parallel to the interior surface of the rear wall gate, to an un-folded position, whereat the seat back extends in a direction generally perpendicular to the interior surface of the rear wallgate, for providing a seat back when the rear wallgate is in the horizontal position.

17. The vehicle body of claim 16 wherein the first compartment further includes a front seat, and the seat cushion and seat back attached to the rear wallgate are stowed between the front seat and the interior surface of the rear wallgate, with the seatback in the folded position, when the rear wallgate is in the vertical position.

* * * * *